United States Patent
Brandt

(10) Patent No.: US 9,192,011 B2
(45) Date of Patent: Nov. 17, 2015

(54) SYSTEMS AND METHODS OF APPLYING BLEED CIRCUITS IN LED LAMPS

(71) Applicant: TerraLux, Inc., Longmont, CO (US)

(72) Inventor: Brian Brandt, Longmont, CO (US)

(73) Assignee: TerraLUX, Inc., Longmont, CO (US)

( * ) Notice: Subject to any disclaimer, the term of this patent is extended or adjusted under 35 U.S.C. 154(b) by 0 days.

(21) Appl. No.: 14/520,671

(22) Filed: Oct. 22, 2014

(65) Prior Publication Data

US 2015/0145441 A1    May 28, 2015

Related U.S. Application Data

(63) Continuation of application No. 13/717,191, filed on Dec. 17, 2012, now Pat. No. 8,896,231.

(60) Provisional application No. 61/576,482, filed on Dec. 16, 2011.

(51) Int. Cl.
| | |
|---|---|
| G05F 1/00 | (2006.01) |
| H05B 37/02 | (2006.01) |
| H05B 39/04 | (2006.01) |
| H05B 41/36 | (2006.01) |
| H05B 33/08 | (2006.01) |

(52) U.S. Cl.
CPC ........ *H05B 33/0845* (2013.01); *H05B 33/0815* (2013.01); *H05B 37/02* (2013.01); *Y02B 20/42* (2013.01)

(58) Field of Classification Search
None
See application file for complete search history.

(56) References Cited

U.S. PATENT DOCUMENTS

| | | |
|---|---|---|
| 4,085,403 A | 4/1978 | Meier et al. |
| 4,529,949 A | 7/1985 | De et al. |
| 4,633,161 A | 12/1986 | Callahan et al. |
| 5,291,607 A | 3/1994 | Ristic et al. |
| 5,334,916 A | 8/1994 | Noguchi |
| 5,401,099 A | 3/1995 | Nishizawa et al. |
| 5,485,576 A | 1/1996 | Fee et al. |
| 5,506,490 A | 4/1996 | Demuro |
| 5,546,041 A | 8/1996 | Szajda |
| 5,606,510 A | 2/1997 | Glaser et al. |
| 5,661,645 A | 8/1997 | Hochstein |
| 5,691,605 A | 11/1997 | Xia et al. |
| 5,781,040 A | 7/1998 | Myers |
| 5,783,909 A | 7/1998 | Hochstein |
| 5,925,990 A | 7/1999 | Crouse et al. |
| 5,942,860 A | 8/1999 | Huynh |
| 6,069,457 A | 5/2000 | Bogdan et al. |
| 6,153,985 A | 11/2000 | Grossman |

(Continued)

FOREIGN PATENT DOCUMENTS

| | | |
|---|---|---|
| CN | 2924996 Y | 7/2007 |
| CN | 103025337 B | 10/2014 |

(Continued)

OTHER PUBLICATIONS

Extended Search Report issued for European Patent Application No. 10732010.3, mailed on Nov. 29, 2013, 7 pages.

(Continued)

*Primary Examiner* — Anh Tran
(74) *Attorney, Agent, or Firm* — Neugeboren O'Dowd PC

(57) ABSTRACT

A bleed circuit is applied to a transformer based on a bleed-on time and a bleed-off time determined by monitoring an output voltage waveform of the transformer.

13 Claims, 12 Drawing Sheets

(56) References Cited

U.S. PATENT DOCUMENTS

| | | |
|---|---|---|
| 6,225,759 B1 | 5/2001 | Bogdan et al. |
| 6,332,710 B1 | 12/2001 | Aslan et al. |
| 6,351,079 B1 | 2/2002 | Willis |
| 6,382,812 B1 | 5/2002 | Hsu |
| 6,429,598 B1 | 8/2002 | Haley |
| 6,459,257 B1 | 10/2002 | Köck |
| 6,515,437 B1 | 2/2003 | Zinkler et al. |
| 6,693,394 B1 | 2/2004 | Guo et al. |
| 6,713,974 B2 | 3/2004 | Patchornik et al. |
| 6,762,629 B2 | 7/2004 | Tam et al. |
| 6,842,668 B2 | 1/2005 | Carson et al. |
| 6,870,325 B2 | 3/2005 | Bushell et al. |
| 6,930,737 B2 | 8/2005 | Weindorf et al. |
| 7,029,145 B2 | 4/2006 | Frederick |
| 7,034,507 B2 | 4/2006 | Lovett |
| 7,049,765 B1 | 5/2006 | Tremaine, Sr. |
| 7,119,498 B2 | 10/2006 | Baldwin et al. |
| 7,126,290 B2 | 10/2006 | Elliott |
| 7,150,561 B1 | 12/2006 | D'Aquino et al. |
| 7,186,000 B2 | 3/2007 | Lebens et al. |
| 7,196,481 B2 | 3/2007 | Bushell et al. |
| 7,204,638 B2 | 4/2007 | Hsu |
| 7,233,258 B1 | 6/2007 | Gelinas |
| 7,242,150 B2 | 7/2007 | DeJonge et al. |
| 7,245,089 B2 | 7/2007 | Yang |
| 7,245,090 B2 | 7/2007 | Yang |
| 7,262,559 B2 | 8/2007 | Tripathi et al. |
| 7,286,123 B2 | 10/2007 | Yang |
| 7,322,718 B2 | 1/2008 | Setomoto et al. |
| 7,330,002 B2 | 2/2008 | Joung, II |
| 7,336,434 B2 | 2/2008 | Lille et al. |
| 7,344,279 B2 | 3/2008 | Mueller et al. |
| 7,358,679 B2 | 4/2008 | Lys et al. |
| 7,423,750 B2 | 9/2008 | Hoshizaki et al. |
| 7,429,129 B2 | 9/2008 | St. Pierre et al. |
| 7,486,030 B1 | 2/2009 | Biggs |
| 7,492,108 B2 | 2/2009 | Garcia et al. |
| 7,504,781 B2 | 3/2009 | Wendt et al. |
| 7,504,783 B2 | 3/2009 | Zarr |
| 7,507,001 B2 | 3/2009 | Kit |
| 7,546,473 B2 | 6/2009 | Newman |
| 7,556,423 B2 | 7/2009 | Caliboso |
| 7,605,550 B2 | 10/2009 | Ferentz et al. |
| 7,612,506 B1 | 11/2009 | Yang et al. |
| 7,626,346 B2 | 12/2009 | Scilla |
| 7,628,507 B2 | 12/2009 | Allen et al. |
| 7,635,957 B2 | 12/2009 | Tripathi et al. |
| 7,656,307 B2 | 2/2010 | Yatsuda et al. |
| 7,656,371 B2 | 2/2010 | Shimizu et al. |
| 7,663,326 B2 | 2/2010 | Santo et al. |
| 7,728,401 B2 | 6/2010 | Takatori |
| 7,755,513 B2 | 7/2010 | Wang et al. |
| 7,777,430 B2 | 8/2010 | Catalano et al. |
| 7,791,326 B2 | 9/2010 | Dahlman et al. |
| 7,792,167 B2 | 9/2010 | Kanesaka |
| 7,800,316 B2 | 9/2010 | Haug |
| 7,800,567 B2 | 9/2010 | Fujino |
| 7,812,551 B2 | 10/2010 | Hite et al. |
| 7,817,009 B2 | 10/2010 | Wang et al. |
| 7,888,623 B2 | 2/2011 | Kawashima et al. |
| 7,888,877 B2 | 2/2011 | Tsai et al. |
| 7,888,942 B2 | 2/2011 | Chen et al. |
| 7,892,870 B2 | 2/2011 | Shi |
| 7,911,156 B2 | 3/2011 | Cottongim et al. |
| 7,911,438 B2 | 3/2011 | Okazaki |
| 7,947,947 B2 | 5/2011 | Ackermann et al. |
| 7,948,190 B2 | 5/2011 | Grajcar |
| 7,948,398 B2 | 5/2011 | Miller |
| 7,986,112 B2 | 7/2011 | West |
| 7,990,077 B2 | 8/2011 | Yu et al. |
| 7,994,725 B2 | 8/2011 | Bouchard |
| 8,686,666 B2 | 4/2014 | Catalano et al. |
| 8,896,231 B2 | 11/2014 | Brandt |
| 2002/0048177 A1 | 4/2002 | Rahm et al. |
| 2003/0015973 A1 | 1/2003 | Ovens et al. |
| 2003/0052658 A1 | 3/2003 | Baretich et al. |
| 2003/0123521 A1 | 7/2003 | Luoma |
| 2004/0164688 A1 | 8/2004 | Van Tichelen et al. |
| 2005/0057184 A1 | 3/2005 | Kaneko et al. |
| 2005/0057187 A1 | 3/2005 | Catalano |
| 2005/0062481 A1 | 3/2005 | Vaughn et al. |
| 2005/0237005 A1 | 10/2005 | Maxik |
| 2006/0038661 A1 | 2/2006 | Reinhold et al. |
| 2006/0119288 A1 | 6/2006 | Ayala et al. |
| 2006/0125773 A1 | 6/2006 | Ichikawa et al. |
| 2006/0152204 A1 | 7/2006 | Maksimovic et al. |
| 2006/0214876 A1 | 9/2006 | Jendbro et al. |
| 2006/0237636 A1 | 10/2006 | Lyons et al. |
| 2006/0238169 A1 | 10/2006 | Baker |
| 2006/0273741 A1 | 12/2006 | Stalker |
| 2007/0040512 A1 | 2/2007 | Jungwirth et al. |
| 2007/0040518 A1 | 2/2007 | Young |
| 2007/0057902 A1 | 3/2007 | Joung, II |
| 2007/0069656 A1 | 3/2007 | Huang |
| 2007/0121324 A1 | 5/2007 | Nakano |
| 2007/0273290 A1 | 11/2007 | Ashdown et al. |
| 2007/0285031 A1 | 12/2007 | Shteynberg et al. |
| 2007/0291483 A1 | 12/2007 | Lys |
| 2008/0018261 A1 | 1/2008 | Kastner |
| 2008/0062070 A1 | 3/2008 | De Oto et al. |
| 2008/0088557 A1 | 4/2008 | Choi |
| 2008/0111505 A1 | 5/2008 | Wang et al. |
| 2008/0122422 A1 | 5/2008 | Zhang et al. |
| 2008/0136334 A1 | 6/2008 | Robinson et al. |
| 2008/0150442 A1 | 6/2008 | Feldtkeller |
| 2008/0151965 A1 | 6/2008 | Kim |
| 2008/0180414 A1 | 7/2008 | Fung et al. |
| 2008/0198613 A1 | 8/2008 | Cruickshank |
| 2008/0203992 A1 | 8/2008 | Qahouq et al. |
| 2008/0204884 A1 | 8/2008 | Jang |
| 2008/0215279 A1 | 9/2008 | Salsbury et al. |
| 2008/0224633 A1 | 9/2008 | Melanson et al. |
| 2008/0231198 A1 | 9/2008 | Zarr |
| 2008/0238340 A1 | 10/2008 | Leung et al. |
| 2008/0258636 A1 | 10/2008 | Shih et al. |
| 2008/0287742 A1 | 11/2008 | St. George et al. |
| 2008/0319690 A1 | 12/2008 | Meadows et al. |
| 2009/0021178 A1 | 1/2009 | Furukawa et al. |
| 2009/0021955 A1 | 1/2009 | Kuang et al. |
| 2009/0097244 A1 | 4/2009 | Lan et al. |
| 2009/0146584 A1 | 6/2009 | Ye et al. |
| 2009/0154525 A1 | 6/2009 | Dai et al. |
| 2009/0167203 A1 | 7/2009 | Dahlman et al. |
| 2009/0179574 A1 | 7/2009 | Chang |
| 2009/0179848 A1 | 7/2009 | Schmidt et al. |
| 2009/0212736 A1 | 8/2009 | Baarman et al. |
| 2009/0251059 A1 | 10/2009 | Veltman |
| 2009/0267523 A1 | 10/2009 | Phillips |
| 2009/0289965 A1 | 11/2009 | Kurokawa et al. |
| 2009/0302783 A1 | 12/2009 | Wang et al. |
| 2009/0306912 A1 | 12/2009 | Chen et al. |
| 2010/0007588 A1 | 1/2010 | Zygmunt et al. |
| 2010/0033095 A1 | 2/2010 | Sadwick |
| 2010/0033112 A1 | 2/2010 | Yen |
| 2010/0039049 A1 | 2/2010 | Hoffman |
| 2010/0066270 A1 | 3/2010 | Yang et al. |
| 2010/0118057 A1 | 5/2010 | Atkins et al. |
| 2010/0134020 A1 | 6/2010 | Peng et al. |
| 2010/0157583 A1 | 6/2010 | Nakajima |
| 2010/0176734 A1 | 7/2010 | Haubmann |
| 2010/0176746 A1 | 7/2010 | Catalano et al. |
| 2010/0194368 A1 | 8/2010 | Taylor et al. |
| 2010/0203465 A1 | 8/2010 | Bria et al. |
| 2010/0225170 A1 | 9/2010 | Hjort et al. |
| 2010/0237787 A1 | 9/2010 | Vogler et al. |
| 2010/0244701 A1 | 9/2010 | Chen et al. |
| 2010/0259191 A1 | 10/2010 | Ghanem et al. |
| 2010/0264795 A1 | 10/2010 | Miao |
| 2010/0277077 A1 | 11/2010 | Pong et al. |
| 2010/0283397 A1 | 11/2010 | Chen et al. |
| 2010/0295474 A1 | 11/2010 | Chemel et al. |
| 2010/0295688 A1 | 11/2010 | Wu et al. |
| 2010/0301751 A1 | 12/2010 | Chobot et al. |
| 2010/0320939 A1 | 12/2010 | Lai |

(56) References Cited

U.S. PATENT DOCUMENTS

| | | |
|---|---|---|
| 2011/0001438 A1 | 1/2011 | Chemel et al. |
| 2011/0019430 A1 | 1/2011 | Wilkinson et al. |
| 2011/0031903 A1 | 2/2011 | Nguyen Hoang et al. |
| 2011/0038715 A1 | 2/2011 | Frank et al. |
| 2011/0043120 A1 | 2/2011 | Panagotacos et al. |
| 2011/0062895 A1 | 3/2011 | Ji |
| 2011/0068715 A1 | 3/2011 | Hum |
| 2011/0080099 A1 | 4/2011 | Teng et al. |
| 2011/0089852 A1 | 4/2011 | Segan |
| 2011/0109231 A1 | 5/2011 | Shiu et al. |
| 2011/0115396 A1 | 5/2011 | Horvath et al. |
| 2011/0115399 A1 | 5/2011 | Sadwick et al. |
| 2011/0115400 A1 | 5/2011 | Harrison et al. |
| 2011/0115645 A1 | 5/2011 | Hall et al. |
| 2011/0121744 A1 | 5/2011 | Salvestrini et al. |
| 2011/0121751 A1 | 5/2011 | Harrison et al. |
| 2011/0121760 A1* | 5/2011 | Harrison et al. ............ 315/309 |
| 2011/0147466 A1 | 6/2011 | Kang et al. |
| 2011/0150028 A1 | 6/2011 | Nguyen Hoang et al. |
| 2011/0156593 A1 | 6/2011 | De Greef et al. |
| 2011/0157238 A1 | 6/2011 | Lin et al. |
| 2011/0163696 A1 | 7/2011 | Huang et al. |
| 2011/0199013 A1 | 8/2011 | Cottrell |
| 2012/0001548 A1 | 1/2012 | Recker et al. |
| 2012/0068618 A1 | 3/2012 | Koski et al. |
| 2012/0268040 A1 | 10/2012 | Riesebosch |
| 2014/0217896 A1 | 8/2014 | Catalano et al. |

FOREIGN PATENT DOCUMENTS

| | | |
|---|---|---|
| DE | 19725710 A1 | 1/1998 |
| EP | 492117 A2 | 7/1992 |
| EP | 657697 A1 | 6/1995 |
| EP | 923274 A2 | 6/1999 |
| EP | 1271799 A1 | 1/2003 |
| EP | 1313353 A1 | 5/2003 |
| EP | 1701589 A1 | 9/2006 |
| EP | 2073607 A1 | 6/2009 |
| EP | 2273851 A2 | 1/2011 |
| GB | 2335334 A | 9/1999 |
| JP | 57-133685 U | 8/1982 |
| JP | 61-66564 A | 4/1986 |
| JP | 2003-188415 A | 7/2003 |
| JP | 2003-317979 A | 11/2003 |
| JP | 2004-296205 A | 10/2004 |
| JP | 2008-172999 A | 7/2008 |
| JP | 2008-224136 A | 9/2008 |
| JP | 2009-83590 A | 4/2009 |
| KR | 1020000006665 A | 2/2000 |
| KR | 1020060098345 A | 9/2006 |
| KR | 1020070053818 A | 5/2007 |
| WO | 90/10238 A2 | 9/1990 |
| WO | 99/00650 A1 | 1/1999 |
| WO | 00/17728 A2 | 3/2000 |
| WO | 2004/075606 A1 | 9/2004 |
| WO | 2005/081591 A1 | 9/2005 |
| WO | 2006/058418 A1 | 6/2006 |
| WO | 2007/147573 A1 | 12/2007 |
| WO | 2008/096249 A2 | 8/2008 |
| WO | 2009/055821 A1 | 4/2009 |
| WO | 2009/079944 A1 | 7/2009 |
| WO | 2010/137002 A1 | 12/2010 |
| WO | 2011/044040 A1 | 4/2011 |
| WO | 2011/051859 A1 | 5/2011 |
| WO | 2011/056242 A1 | 5/2011 |
| WO | 2011/114250 A1 | 9/2011 |
| WO | 2011/137646 A1 | 11/2011 |
| WO | 2011/145009 A1 | 11/2011 |
| WO | 2012/007798 A2 | 1/2012 |
| WO | 2012/087268 A2 | 6/2012 |

OTHER PUBLICATIONS

International Application Serial No. PCT/US2010/020819, International Preliminary Report on Patentability mailed on Jul. 28, 2011, 7 pages.

International Application Serial No. PCT/US2010/020819, International Search Report and Written Opinion mailed on Aug. 13, 2010, 8 pages.

International Application Serial No. PCT/US2010/057060, International Preliminary Report on Patentability mailed on Jan. 24, 2013, 8 pages.

International Application Serial No. PCT/US2010/057060, International Search Report and Written Opinion mailed on Nov. 23, 2012, 11 pages.

International Application Serial No. PCT/US2011/051883, International Search Report and Written Opinion mailed on Feb. 6, 2012, 11 pages.

International Application Serial No. PCT/US2012/039558, International Preliminary Report on Patentability mailed on Dec. 5, 2013, 7 pages.

International Application Serial No. PCT/US2012/039558, International Search Report and Written Opinion mailed on Sep. 24, 2012, 8 pages.

International Application Serial No. PCT/US2012/070126, International Search Report mailed on May 6, 2013, 3 pages.

Prendergast, Patrick, "Thermal Design Considerations for High Power LED Systems", Cypress Semiconductor Corp., Published in Planet Analog, Mar. 2007, pp. 1-8.

First Examiner Report Received for Australian Patent Application No. 2012258584 mailed on May 20, 2014, 3 pages.

Notice of Decision to Grant Received for Chinese Patent Application No. 2010800615881 mailed on Jun. 4, 2014, 2 of official copy only.

Examiner Report Received for European Patent Application No. 10859616.4 mailed Oct. 28, 2014, 4 pages.

Examiner Report Received for Japanese Patent Application No. 2012-549988 mailed Oct. 2, 2014, 16 pages (10 pages of English Translation and 6 pages of Official copy).

International Application Serial No. PCT/US2012/070126, International Preliminary Report on Patentability mailed Jun. 26, 2014, 8 pages.

* cited by examiner

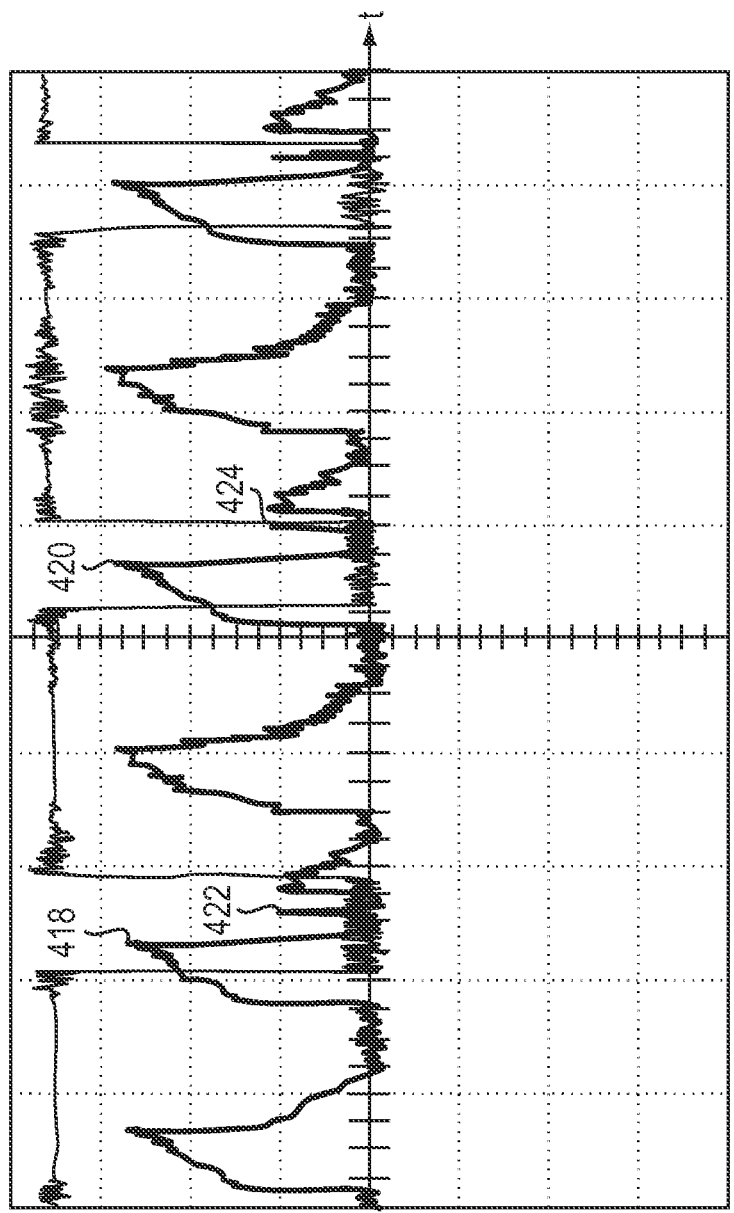

SYSTEMS AND METHODS OF APPLYING BLEED CIRCUITS IN LED LAMPS

CROSS-REFERENCE TO RELATED APPLICATION

This application is a continuation of, and claims priority to and the benefits of, U.S. patent application Ser. No. 13/717,191, filed Dec. 17, 2012, which claims priority to, and the benefits of, U.S. Provisional Application Ser. No. 61/576,482, filed on Dec. 16, 2011, the entire disclosure of which is hereby incorporated by reference.

FIELD OF THE INVENTION

Embodiments of the invention generally relate to light-emitting-diode (LED) lamps and, more particularly, to applications of a bleed circuit in such lamps.

BACKGROUND

An LED lamp (also known as a bulb or, more generally, an LED lighting product) may be used to replace an incandescent, halogen, or other bulb; the LED lamp provides the same or similar light while consuming less power and providing a longer operational lifetime. One of the difficulties in designing, in particular, halogen-replacement LED lamps is compatibility with the transformers—for example, electronic transformers—that have traditionally powered halogen bulbs. An electronic transformer is a complex electrical circuit and produces a high-frequency (i.e., 100 kHz or greater) AC voltage with a low-frequency (60 Hz) envelope output. An LED lamp powered by the electronic transformer requires a special design to ensure a consistent light output, free of any random or periodic flicker. For example, the electronic transformer has a minimum load requirement; below this minimum load, a portion of the transformer's pulse-train output is either intermittent or entirely cut off. If the load is absent or insufficient, the electronic transformer will enter a low power (or "sleep") mode until the minimum load requirement is satisfied. When the transformer alternately enters and exits the sleep mode, flickering of the LED lamp may result.

To avoid this problem, some LED lamps use a "bleed" circuit (or a "bleeder"), including, for example, a resistive element, to ensure that the minimum load requirement of the electronic transformer is constantly satisfied. The bleed circuit, however, does not produce light; it merely wastes power, especially if the bleed circuit is implemented during the entire output voltage waveform of the electronic transformer. The bleed circuit, therefore, may not be compatible with a low-power application. Additionally, the time interval during which the bleed circuit is applied to the electronic transformer (the "application time") may vary if dimming is implemented or different combinations of the electronic transformer and dimmer are used with the LED lamp. A fixed application time may result in unwanted deactivation, or switching on the sleep mode, of the electronic transformer. The application time of the bleed circuit may be determined by continuously monitoring the output voltage waveform of the transformer. However, the necessary monitoring circuitry, if continuously utilized during operation of the LED, will itself undesirably waste power and may generate waste heat that must be dissipated to extend the LED lifetime. Consequently, there is a need for an approach that can determine the appropriate application time of the bleed circuit with minimized power consumption during operation of the LED lamp.

SUMMARY

In various embodiments, the present invention relates to systems and methods for applying a bleed circuit to an electronic transformer using a "bleed-on" timer and a "bleed-off" timer. The "bleed-on" and "bleed-off" timers, for counting down the time that the bleed circuit is on and off, respectively, are set based on the leading and trailing edges of an output voltage waveform of the electronic transformer when an LED lamp is powered on for the first time; the determined bleed-on and bleed-off times are used to activate and de-activate the bleed circuit during the operation of the LED lamp with no need to continuously monitor the voltage waveform at the output of the transformer. In one embodiment, the bleed-on and bleed-off times are stored in non-volatile memory and can be retrieved and used to control the application of the bleed circuit to the transformer each time the LED lamp is turned on; this avoids the need for monitoring circuitry as well as time delays imposed by the need to analyze the output voltage waveform and then determine the application time of the bleed circuit. Utilization of bleed-on and bleed-off timers thus avoids initial flickering when the LED lamp is turned on and obviates the need for additional power-consuming circuitry.

In some embodiments, when a sleep mode (or turnoff) of the electronic transformer is detected (via monitoring the period or frequency of the output voltage waveform, for example) due to, e.g., the use of a dimming system or different combinations of the electronic transformer and dimmer, the bleed-on and bleed-off times of the bleed circuit are adjusted until the minimum load requirement is satisfied and/or the period of the output voltage waveform is equivalent to that of the transformer. The bleed-on and bleed-off times are then stored in non-volatile memory and can be retrieved upon power-up of the LED lamp. Accordingly, while monitoring circuitry may be used initially to set the timing of the bleed circuit, it not used thereafter to actually control the circuit. This approach reduces energy consumption while operating the LED lamp in addition to satisfying the minimum load requirement of the electronic transformer to prevent flickering in the LED lamp.

Accordingly, in one aspect, the invention pertains to a method of operating an LED system including an electronic transformer. In representative embodiments, the method includes monitoring an output voltage waveform of the transformer; starting a bleed-on timing cycle upon sensing a first voltage-waveform condition and ending the bleed-on timing cycle after the determined bleed-on time has elapsed; starting a bleed-off timing cycle upon sensing a second voltage-waveform condition different from the first voltage-waveform condition, and ending the bleed-off timing cycle after the determined bleed-off time has elapsed; and engaging a bleed circuit to the transformer based on a state of the bleed-on timing cycle and disengaging the bleed circuit from the transformer based on a state of the bleed-off timing cycle. In one implementation, the bleed circuit is engaged for a duration adequate to ensure a minimum load on the transformer sufficient to avoid cut-off throughout the output voltage waveform.

In various embodiments, the relevant state of the bleed-on timing cycle is the start of the cycle, and the relevant state of the bleed-off timing cycle is the end of the cycle. The bleed-on timing cycle may start when the trailing edge of the output voltage waveform falls below a predetermined threshold and may end when a subsequent trailing edge of the output voltage waveform falls below a predetermined minimum threshold. The bleed-off timing cycle may start when the leading edge of the output voltage waveform begins to rise and may end when the leading edge of the output voltage waveform exceeds a predetermined maximum threshold.

In some embodiments, the method includes, for a current bleed-on timing cycle, starting the current bleed-on timing cycle upon sensing that the trailing edge of the output voltage waveform falls below the predetermined threshold, determining how much time has elapsed since the trailing edge of the output voltage waveform previously fell below the predetermined threshold, and ending the current bleed-on timing cycle after that determined time interval has elapsed. In one embodiment, the method further includes (i) for an initial bleed-off timing cycle, starting the bleed-off timing cycle upon sensing that the leading edge of the output voltage waveform has begun to rise; ending the bleed-off timing cycle upon sensing that the leading edge of the output voltage waveform exceeds the predetermined maximum threshold; and determining the time interval between the starting and ending of the bleed-off timing cycle; and (ii) for a subsequent bleed-off timing cycle, starting the bleed-off timing cycle upon sensing that the leading edge of the output voltage waveform has begun to rise; and ending the bleed-off timing cycle after the determined time interval has elapsed. The method may include, for multiple subsequent bleed-on timing cycles, omitting the determining step and ending a subsequent bleed-on timing cycle after the time interval has elapsed. In one implementation, the method includes repeating step (ii) for multiple subsequent bleed-off timing cycles.

In one embodiment, the bleed-on and bleed-off timing cycles are determined based on a period of the output voltage waveform. For example, the bleed-on timing cycle and the bleed-off timing cycle are adjusted until the period of the monitored output voltage waveform is equivalent to a predetermined period of the output voltage waveform generated by the transformer.

In another aspect, the invention relates to a system for minimizing flicker in a circuit having an LED lamp and an electronic transformer. In various embodiments, the system includes a bleed circuit, an analyzer for monitoring an output voltage waveform of the transformer and determining a bleed-on timing cycle and a bleed-off timing cycle based at least in part on the monitored output voltage waveform, a memory for storing a duration of the bleed-on timing cycle and a duration of the bleed-off timing cycle, and control circuitry for engaging the bleed circuit to the transformer during only a portion of a period of the output voltage waveform and based at least in part on the stored durations. The bleed circuit ensures a minimum load on the transformer sufficient to avoid cut-off.

The bleed circuit may include a resistor and/or a transistor. The analyzer may be configured to start a bleed-on timing cycle when the trailing edge of the output voltage waveform falls below a predetermined threshold and to end the bleed-on timing cycle when a subsequent trailing edge of the output voltage waveform falls below a predetermined minimum threshold. Additionally, the analyzer may be configured to start a bleed-off timing cycle when the leading edge of the output voltage waveform begins to rise and to end the bleed-off timing cycle when the leading edge of the output voltage waveform exceeds a predetermined maximum threshold. In some embodiments, the control circuit is configured to engage the bleed circuit at the start of a bleed-on timing cycle and to disengage the bleed circuit at the end of a bleed-off timing cycle.

As used herein, the term "approximately" means±10°, and in some embodiments, ±5°. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which:

FIG. 4C depicts an output waveform of an electronic transformer having an improperly loaded bleed circuit.

DETAILED DESCRIPTION

Figure 1A:
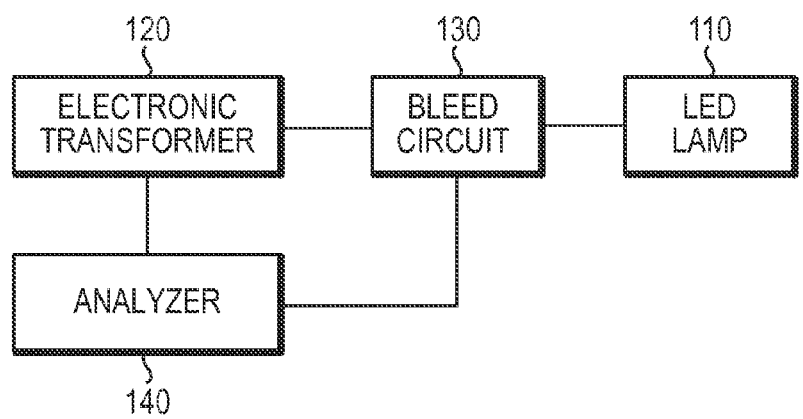
FIG. 1A schematically illustrates an LED lighting system in accordance with an embodiment of the present invention.
Figure 1B:
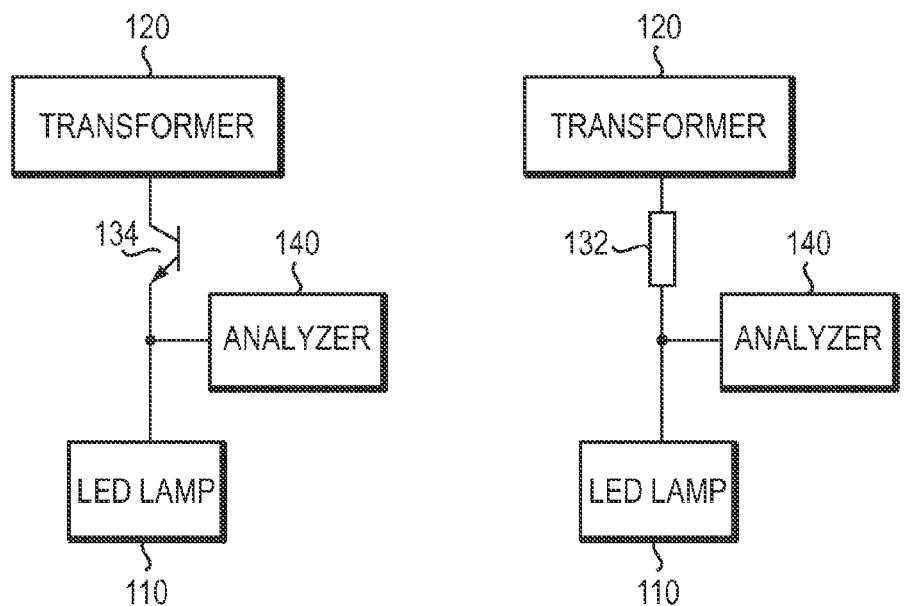
FIG. 1B schematically depicts a bleed circuit in accordance with an embodiment of the present invention.

Described herein are various embodiments of energy-efficient methods and systems for preventing flickering due to violation of a minimum resistive load requirement. FIG. 1A illustrates an LED lamp 110 powered by a conventional electronic transformer 120 and incorporating a bleed circuit 130. Referring to FIG. 1B, in one embodiment, the bleed circuit 130 includes a low-impedance load, for example, a resistor 132 and/or a transistor 134 configured to ensure that the minimum load requirement for operating the electronic transformer 120 remains satisfied. The output voltage waveform of the electronic transformer 120 is monitored using an analyzer, a comparator, and/or other conventional monitoring circuitry 140 (hereafter referred to simply as an "analyzer"). The analyzer 140 selectively connects the bleed circuit 130 to, and disconnects it from, the electronic transformer 120 based on the monitored waveform. The analyzer 140 may be a portion of (or implemented using) a processor, e.g., a microprocessor, microcontroller, application-specific integrated circuit (ASIC), field-programmable gate array (FPGA), or any other type of digital-logic or mixed-signal circuit.

Figure 2A:
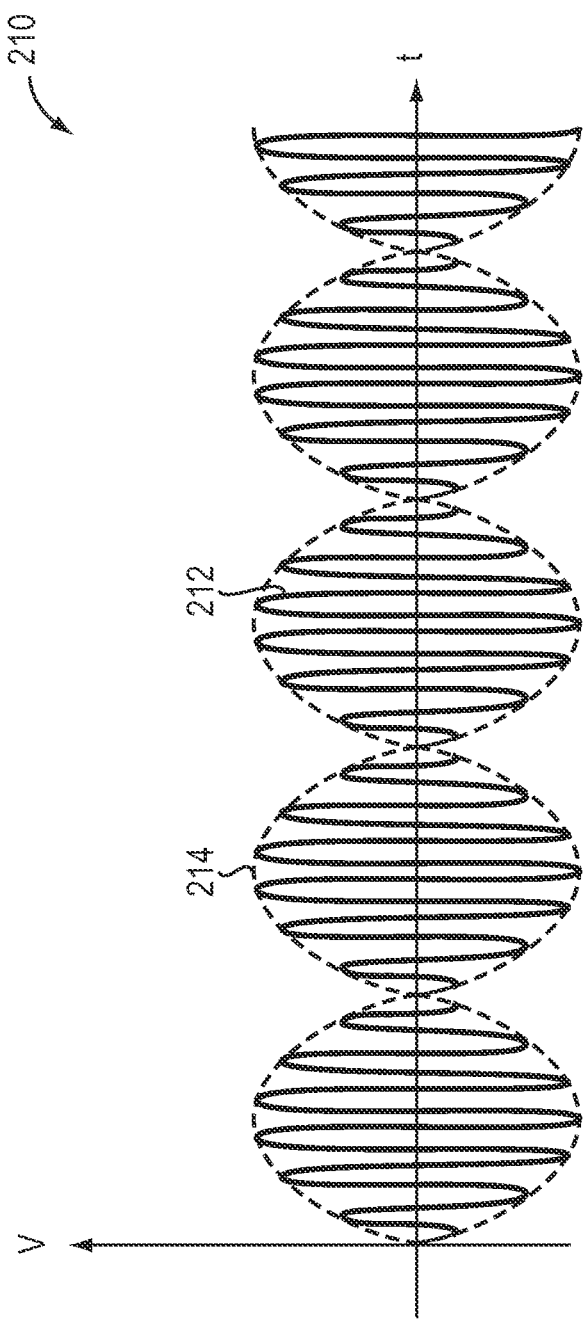
FIG. 2A is a voltage waveform at the output of an electronic transformer.
Figure 2B:
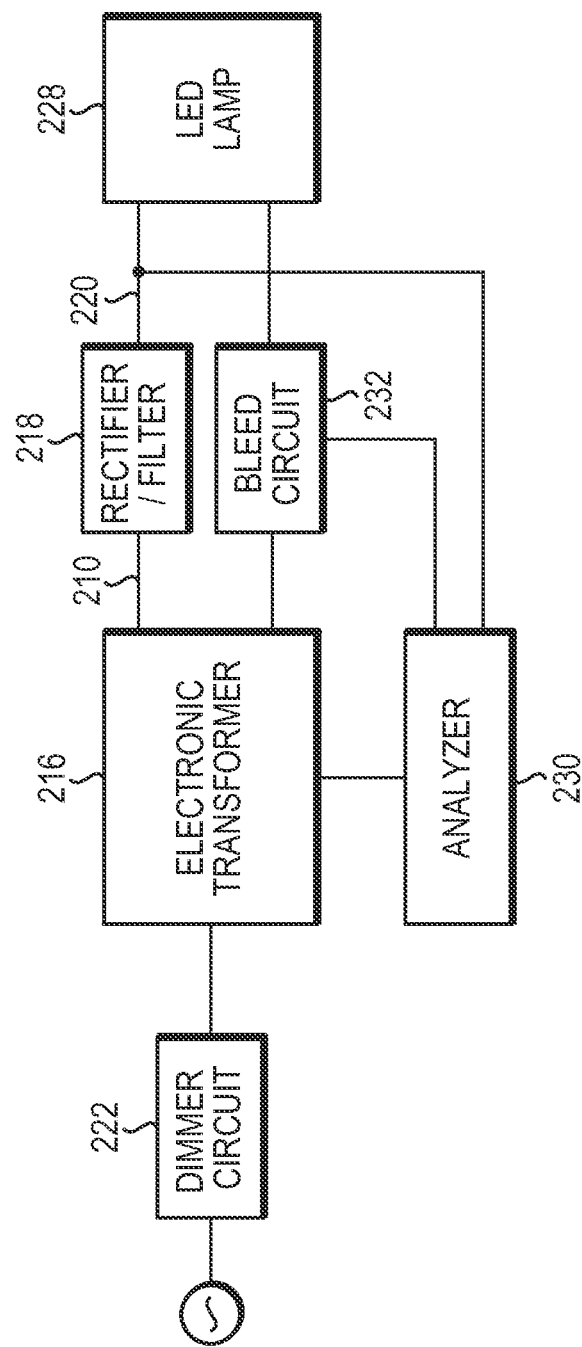
FIG. 2B schematically illustrates an LED lighting system including a rectifier/filter and a dimmer circuit in accordance with an embodiment of the present invention.
Figure 2C:
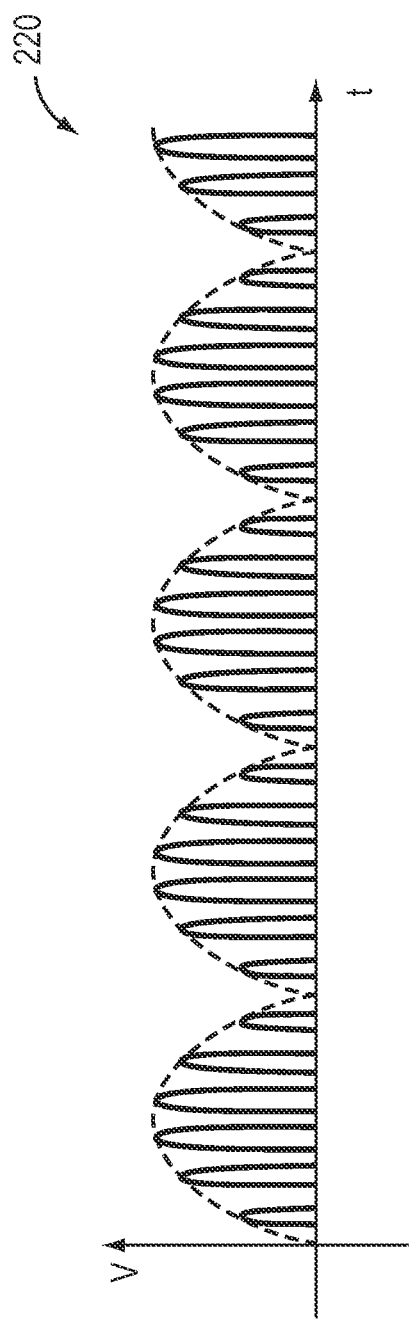
FIG. 2C is a rectified voltage waveform at the output of an electronic transformer.
Figure 2D:
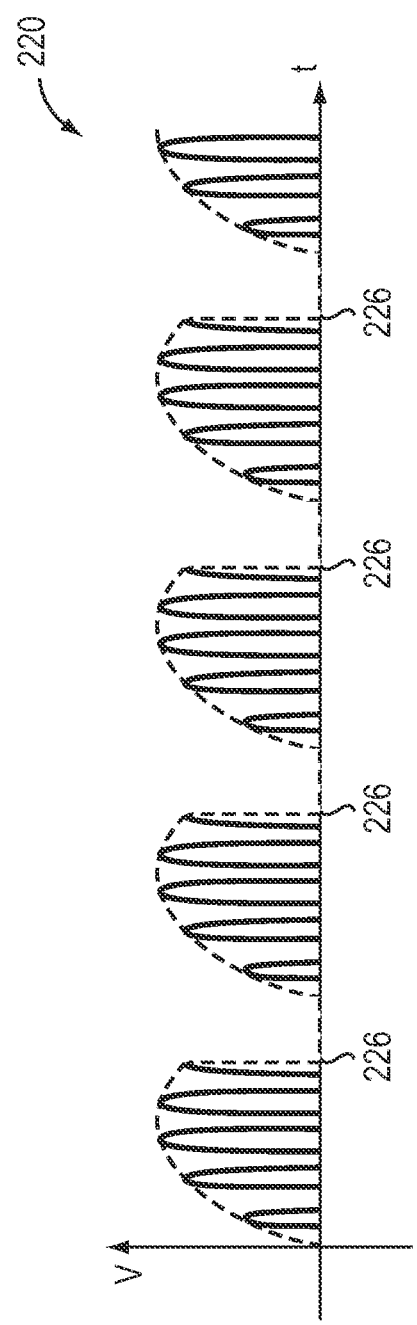
FIG. 2D is a chopped voltage waveform at the output of an electronic transformer using a dimmer circuit.

Referring to FIG. 2A, the electronic transformer is a complex electrical circuit that produces a waveform 210 having a high-frequency (i.e., 10 kHz or greater) AC voltage 212 with an "envelope" 214 approximating a 60 Hz sinusoidal waveform (similar to the frequency produced by a magnetic transformer). Referring to FIG. 2B, in one embodiment, the AC output voltage 210 of the electronic transformer 216 is rectified and typically filtered using a conventional rectifier/filter circuit 218 including, for example, a diode bridge and a filter capacitor. FIG. 2C depicts the rectified and filtered output voltage waveform 220, which is indicated by the dashed envelope. In one embodiment, the LED lamp system includes a dimmer circuit 222 that operates by phase dimming, in which a portion of a dimmer-input waveform (i.e. the output waveform of the rectified and filtered voltage 220) is cut off or "chopped" to produce a temporally clipped version of the waveform. FIG. 2D illustrates the waveform 220 that results from chopping the output waveform at a trailing-edge point 226. The duration (i.e., duty cycle) of the clipping corresponds to the level of dimming desired—more clipping produces a dimmer light. In some embodiments, the maximum current passing through the LED lamp 228 is reduced, based on, for example, the phase angle (i.e., dimming level) of the dimmer circuit, to achieve a desired dimming. Accordingly, unlike the dimmer circuit for an incandescent light, where the clipped input waveform directly supplies power to the lamp (with the degree of clipping determining the amount of power supplied and, hence, the lamp's brightness), in the LED lamp 228 the received input waveform 220 is analyzed by the analyzer 230 to infer the dimmer setting and, based thereon, the bleed circuit 232 operates to ensure that the minimum load requirement of the electronic transformer 216 is constantly satisfied.

Figure 3A:
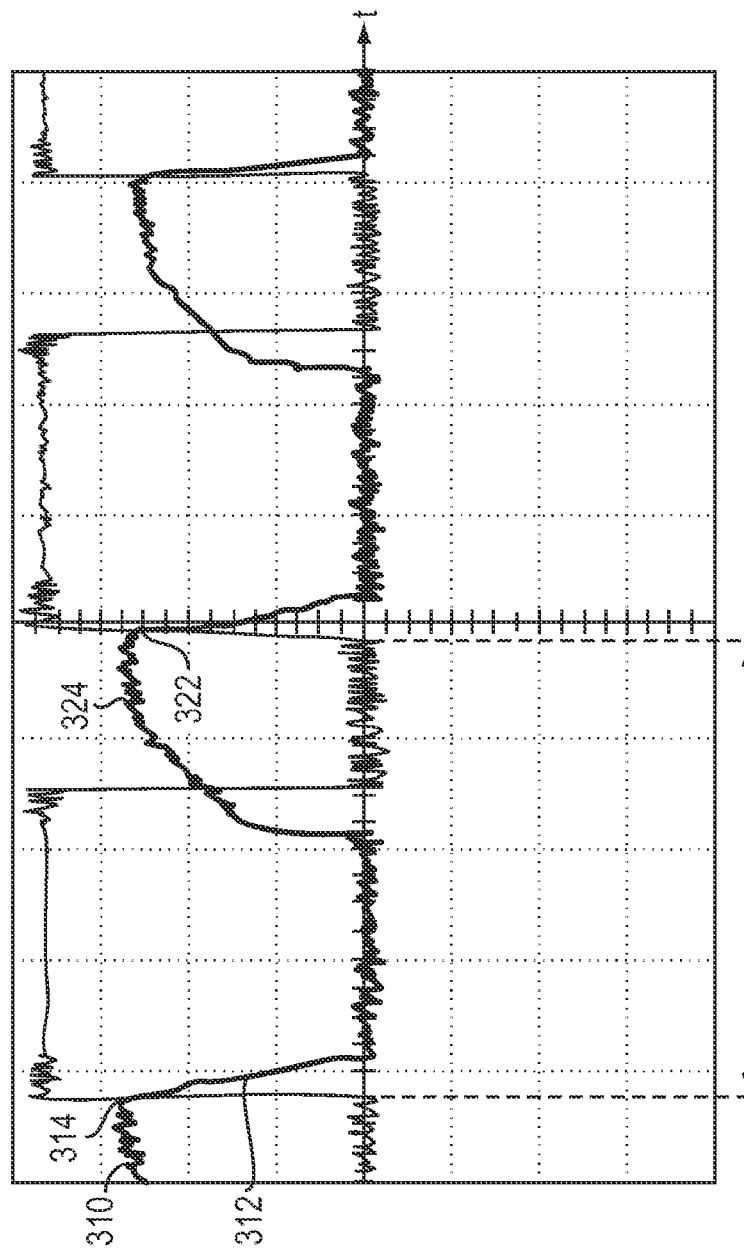
FIG. 3A depicts a setup of a bleed-on timer in accordance with an embodiment of the present invention.
Figure 3B:
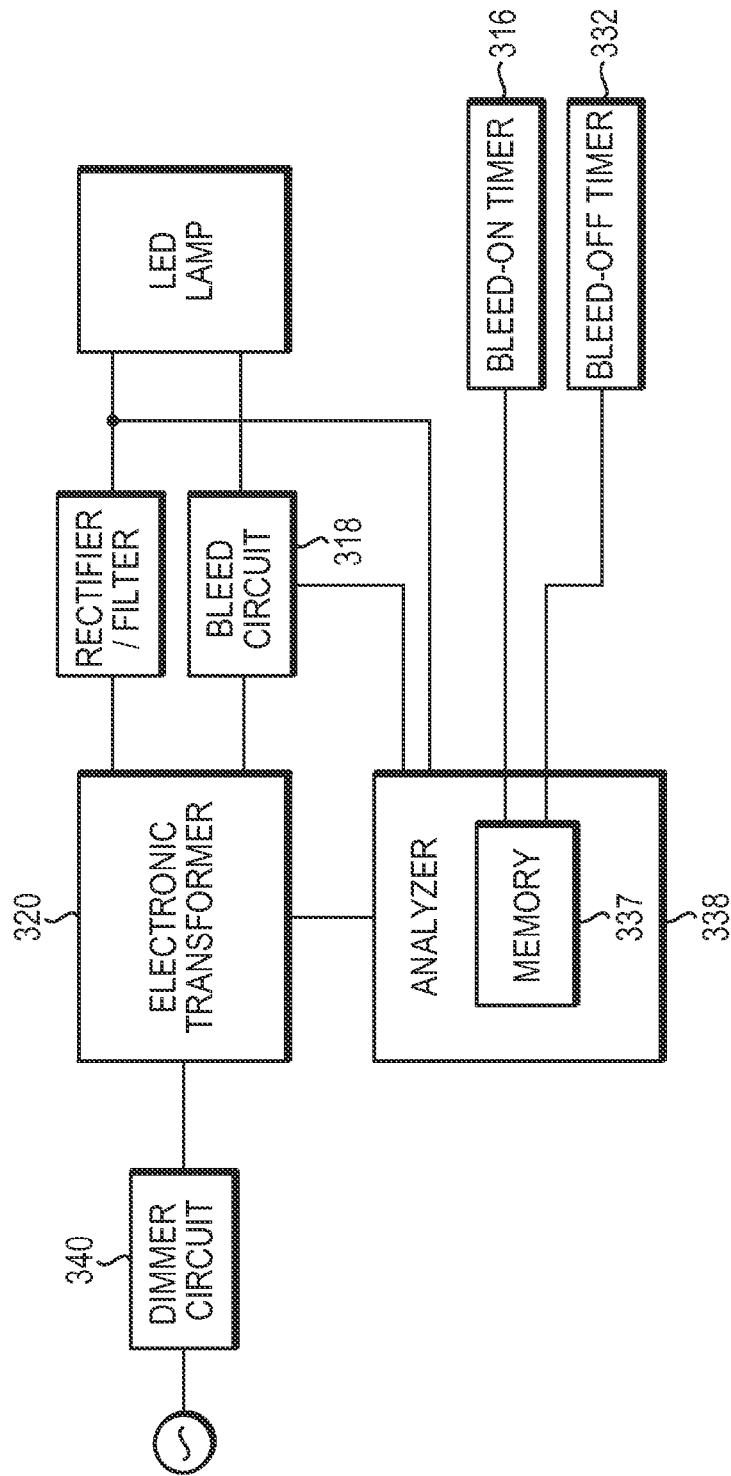
FIG. 3B schematically illustrates an LED lighting system including a bleed-on timer and a bleed-off timer in accordance with an embodiment of the present invention.

FIG. 3A illustrates a representative embodiment in which the rectified and filtered output waveform 220 of the electronic transformer 216 is monitored by the analyzer 230 continuously. In the illustrated embodiment, the analyzer 230 (which may be implemented in or by using a processor, as noted above) samples the voltage of the output waveform 310. When the trailing edge 312 of the output voltage waveform 310 falls below a predetermined minimum threshold (or failing point, e.g., 10% of the peak output voltage) at a time 314, a bleed-on cycle is started, and the bleed-on timer 316 is automatically initiated; the bleed circuit 318 is applied to the electronic transformer 320 as depicted in FIG. 3B. The end of the bleed-on cycle occurs just prior to the next failing point 322 of the next period of the output waveform 324, and the timer 316 has expired. As a result, the bleed-on cycle time 326 is substantially equivalent to the period of the output voltage waveform 310, and is stored in a non-volatile memory 337 operatively connected to (and located inside or external to) the analyzer 338. Alternatively, the active period of the bleed-on timer may be empirically determined based on the load of the LED lamp and the minimum load requirements of the majority of the electronic transformers intended for use therewith. Again, this active period is stored in the memory 337.

Figure 3C:
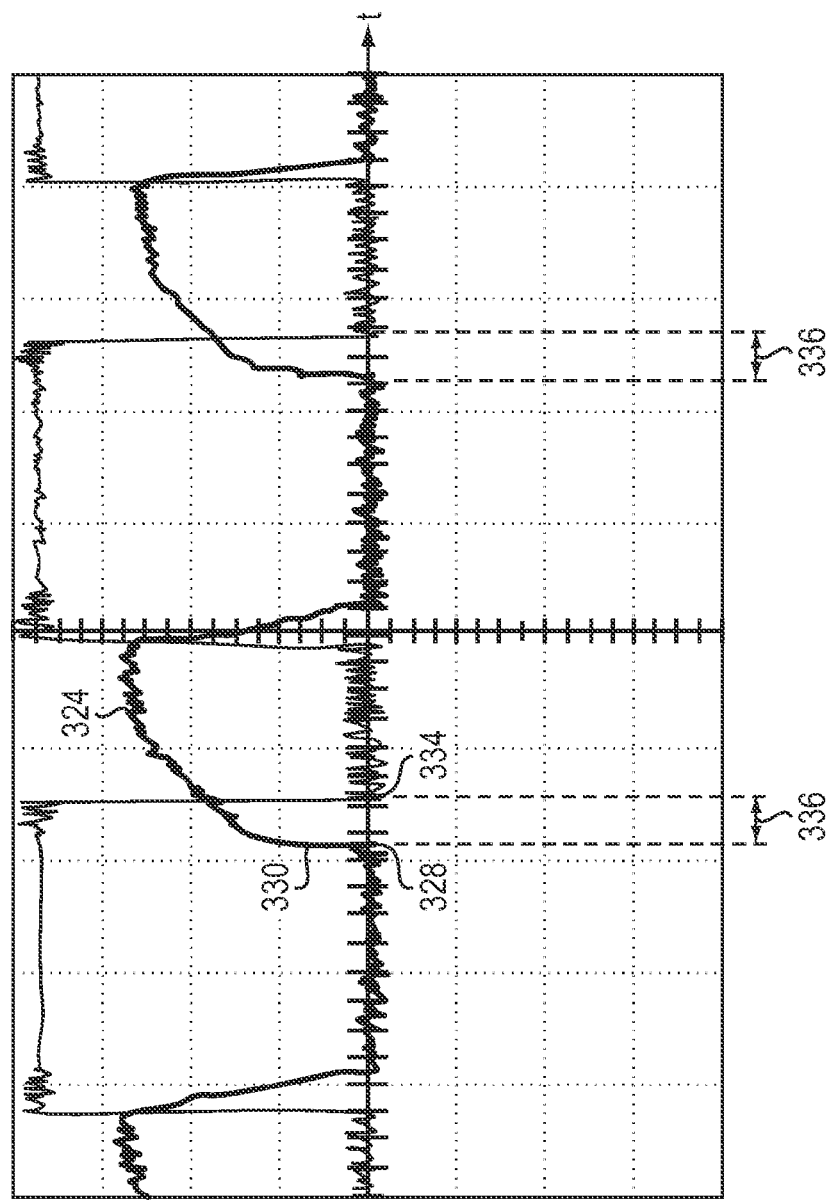
FIG. 3C depicts a setup of a bleed-off timer in accordance with an embodiment of the present invention.

Referring to FIG. 3C, when the output voltage starts to rise (i.e., at the time 328 of the leading edge 330), the bleed-off timer 332 is initiated. The end of the bleed-off cycle occurs when, for example, the leading edge 330 of the output voltage waveform 324 exceeds a predetermined maximum threshold (e.g., 50% of the peak output voltage); at this point the bleed off timer 332 is turned off. In one embodiment, the bleed-off cycle time recorded by the timer 332 is stored in the memory 337.

Control logic, implemented in the bleed circuit 318 or the analyzer 338, cause the bleed circuit 318 to turn on and turn off in accordance with the stored bleed on time 326 and/or bleed off time, 336; that is these cycle times may be used to engage and disengage the bleed circuit 318 to and from the electronic transformer 320. For example, the bleed circuit 318 may be engaged at the beginning 314 of the bleed-on cycle (FIG. 3A) and turned off at the end 334 of the bleed-off cycle (FIG. 3C). During most of the positive portion of the output waveform, therefore, the bleed circuit 318 is inactive. Applications of the bleed-on and bleed-off times based on the monitored output voltage waveform and predetermined maximum and minimum thresholds therefore prevents wasting energy while keeping the minimum load requirement satisfied. In one embodiment, the bleed-on time and/or bleed-off time (particularly the bleed-off time) is consistent over time for devices of a certain type, and therefore can be stored in memory and retrieved to control the application of the bleed circuit to the transformer during the operation of the LED lamp. For example, the bleed-on time and/or bleed-off time may be reset only when the output waveform of the transformer is changed, as further described below. In other embodiments, the bleed-on and/or bleed-off times may be re-evaluated periodically and changed as necessary.

Typically, the onset of a bleed-on cycle and a bleed-off cycle are triggered by conditions sensed by the analyzer 338—i.e., when the output voltage starts to rise (in the case of the bleed-off cycle) and when the output voltage falls below the predetermined minimum threshold after rising (in the case of the bleed-on cycle). The stored interval values may be used to establish when each cycle ends (which, in the case of the bleed-on cycle, also marks the beginning of the next cycle). Because electronic transformers can behave erratically even during continuous operation, it may be useful to sense, every few cycles or even every cycle, the conditions corresponding both to the beginning and end of each cycle, and to update the stored cycle times accordingly. Even if these values are updated every cycle, a benefit is obtained in that the stored value from the previous cycle is used for the current cycle, obviating the need to predicate both the beginning and ending of a cycle on sensed conditions, since sensing can introduce delay. Updated values will be used predictively on the next cycle and will never be more out of date than the reciprocal of the update frequency. The update frequency will be adequate so long as perceptible flicker is avoided. Often it is found necessary to adjust the bleed-off time less frequently than the bleed-on time, and indeed, the bleed-off time may often be set a single time (e.g., when the LED is first powered on) without updating.

The stored bleed-on and/or bleed-off times 326, 336 thereby facilitate predictive operation of the bleed circuit 318 during operation of the LED lamp. For example, the bleed circuit can be automatically applied to the electronic transformer upon the next bleed-on start time; the bleed circuit then stays connected until the next bleed-off stop time. In addition, during a later use of the LED lamp, if the circuitry of the electronic transformer 320 and the dimmer circuit 340 is unchanged, the bleed-on and/or bleed-off times stored in non-volatile memory can be retrieved and directly applied to the LED lamp when the LED lamp is turned on, and the transformer output waveform monitored as necessitated by variability in its output. Even with a relatively stable output, the full output voltage waveform may be monitored on a periodic basis, such as after every ten-hour use of the LED lamp; this ensures proper performance of the bleed circuit even with aging components or changing environmental conditions. Because the bleed circuit is switched in for only a portion of the output cycle, energy waste and the generation of excessive heat is avoided. In addition, the bleed-on and/or bleed-off timers allows the bleed circuit to be applied immediately after the LED lamp is turned on without time delays caused by analyzing the output voltage waveform; this avoids the initial flickering that is generally present in conventional LED lamps.

In some embodiments, when the transformer 320 and/or the dimmer 340 is changed, the bleed-on and/or bleed-off times may be reset by choosing a previously stored value from various dimming modes or by pressing and holding a "mode" button for a predetermined time, for example, 5 seconds. Upon receiving this signal, the analyzer 338 monitors the rectified and filtered output waveform of the dimmer circuit 340 and again determines the bleed-on and bleed-off times using the approach as described above.

It should be noted that the bleed-on and bleed-off timers need not be separate components, but instead can be the same timer configured to signal the occurrence (e.g., by issuing a pulse) of a relevant state—e.g., the start and/or end of a timing cycle. Thus, the bleed-on start and stop times may be stored in memory, and the timer configured to issue a pulse upon the occurrence of the bleed-on start time (i.e., the beginning of the bleed-on timing cycle in order to cause control logic to engage the bleed circuit) and the bleed-off end time (i.e., the end of the bleed-off timing cycle in order to cause control logic to disengage the bleed circuit). The timer(s) can also be configured as a finite-state machine.

In one embodiment, the bleed-on and bleed-off timers utilize a system clock implemented in the analyzer 338. The bleed-on and bleed-off times are computed based on the period $T_{sclk}$ of the system clock and a count value generated using, for example, a digital counter. For example, in a typical implementation, the count values for the bleed-on and bleed-off times may be roughly $5 \times 10^5$ and $10^5$ cycles, respectively; assuming that the frequency of the analyzer is 100 MHz (i.e., $T_{sclk}$=10 ns), the bleed-on and bleed-of times are roughly 5 ms and 1 ms, respectively, and, as shown in FIGS. 3A and 3C, the bleed circuit will be active for slightly more than half the duty cycle. Utilization of the system clock thus conveniently and accurately records the bleed-on and bleed-off times without extra circuitry. In another embodiment, the bleed-on and bleed-off timers are external timers connected to the analyzer 338; they can be easily removed once the bleed-on and bleed-off times have been determined and stored in the memory.

In one embodiment, the bleed circuit is continuously connected to the electronic transformer 320 when the LED lamp is operated in the minimum dimming situation (i.e., the current drawn from the LEDs is at the minimum value and thus unable to keep the electronic transformer "awake"). For example, if the voltage waveform is detected to be chopped at a phase angle smaller than approximately 60 degrees or the LED operating time is less than approximately 3 ms, this indicates that the LED lamp is in the minimum dimming situation and the bleed circuit 318 should be constantly applied to the electronic transformer 320 to satisfy the minimum load requirement. Additionally, this ensures that the phase angle of the detected voltage waveform is "locked in" at a limited value, thereby limiting the power dissipation in the bleed circuit 318 until such time as enough power is applied to the LEDs to facilitate switching the bleed circuit 318 in and out of the LED lamp circuit.

Additionally, the LED lamp may be connected to electronic transformers 320 having various output frequencies. In one embodiment, the LED lamp is powered by an electronic transformer 320 having an output frequency of, for example, 50 Hz. The period of the transformer output waveform may be measured using the same edge-detection approach as described above for determining the bleed-on and/or bleed-off times of the bleed circuit 318. The bleed-on and/or bleed-off times applied to the bleed circuit 318 can be then adjusted to ensure that the transformer functions properly at its operating frequency (i.e., 50 Hz). At a later time, if the LED lamp is powered by another transformer with a different output frequency (e.g., 60 Hz), the bleed-on and/or bleed-off times applied to the bleed circuit 318 can, again, be adjusted so that it functions properly at the new output frequency.

In some embodiments, a different electronic transformer may replace the original transformer during the lifetime of an LED lamp lifetime. The new transformer may have the same output voltage waveform as the replaced transformer, or a different one. In some embodiments, when a new transformer is employed in the LED lamp circuit, the bleed circuit is applied based on the bleed-on and/or bleed-off times stored in memory and the period of the output waveform is measured through edge detection of the leading and trailing edges of the electronic transformer. If the period is approximately (e.g., within 10%) 8.33 ms (derived from a rectified 60 Hz AC mains supply voltage), the bleed circuit will operate properly with the new transformer. If, however, the period differs significantly from the expected value (i.e., more or less than 10% of 8.33 ms), the bleed-on and/or bleed-off times applied to the bleed circuit are adjusted, using the initialization procedure discussed above, to avoid flickering.

Figure 4A:
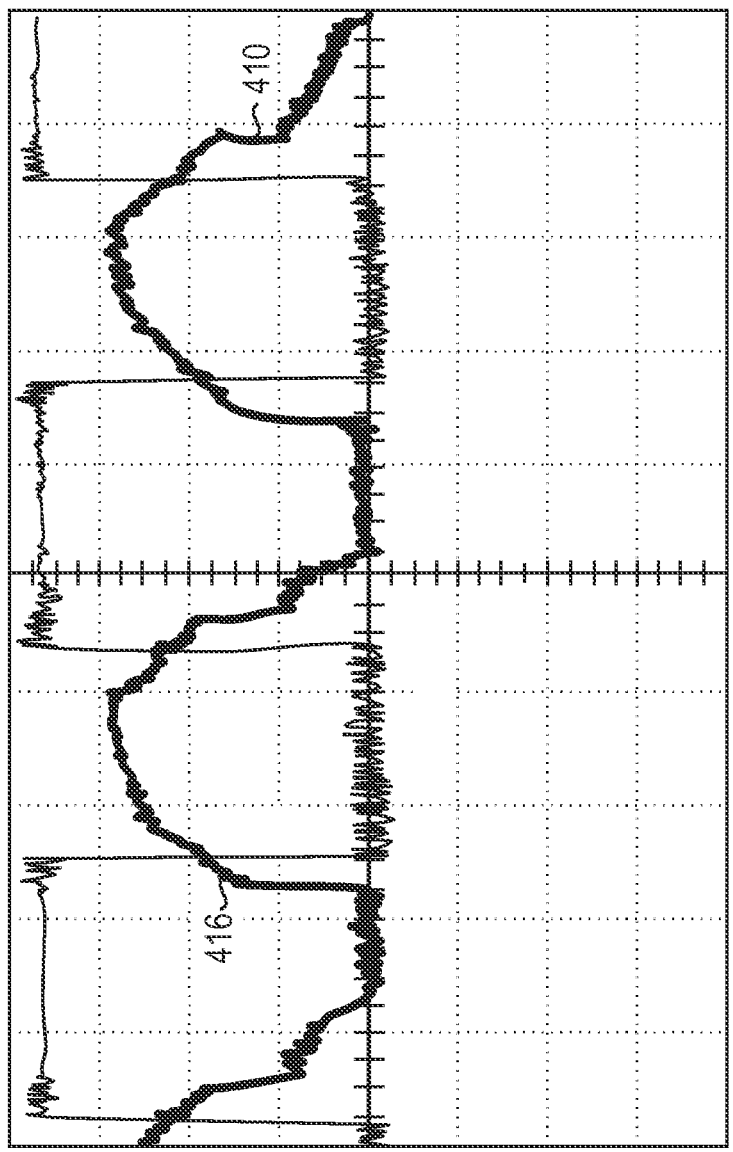
FIG. 4A depicts an output waveform of an electronic transformer having a long trailing edge.
Figure 4B:
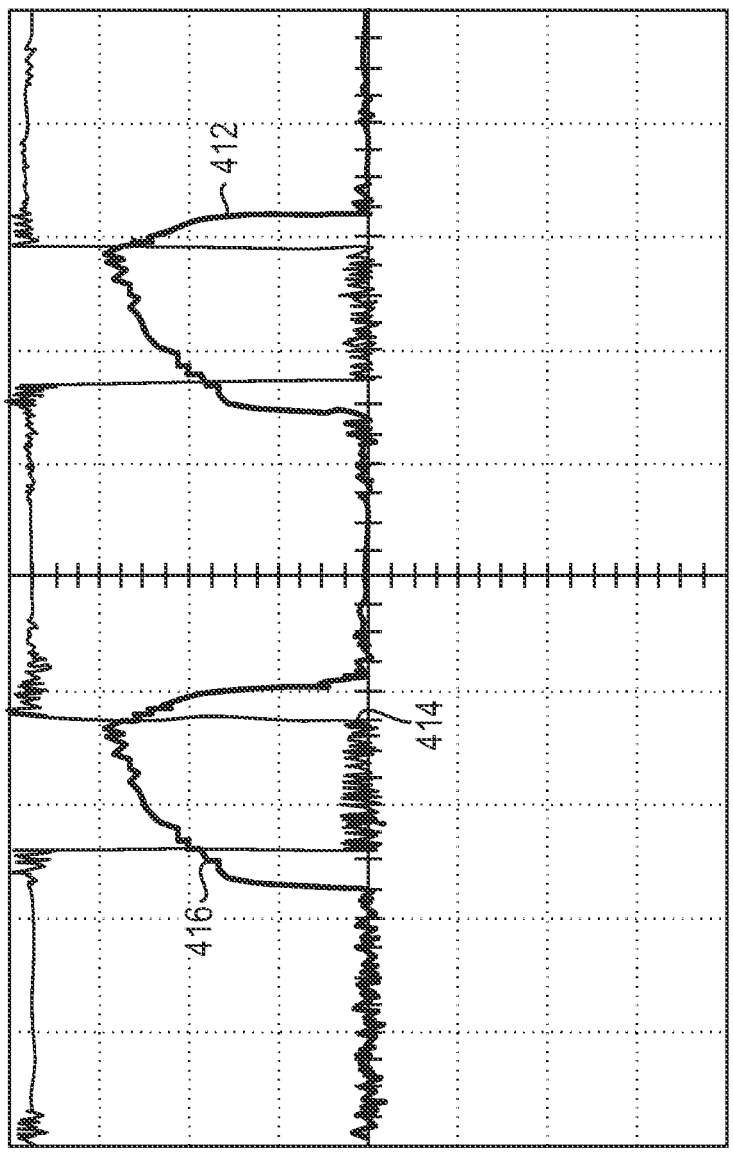
FIG. 4B depicts an output waveform of an electronic transformer using a dimmer circuit.
Figure 4D:
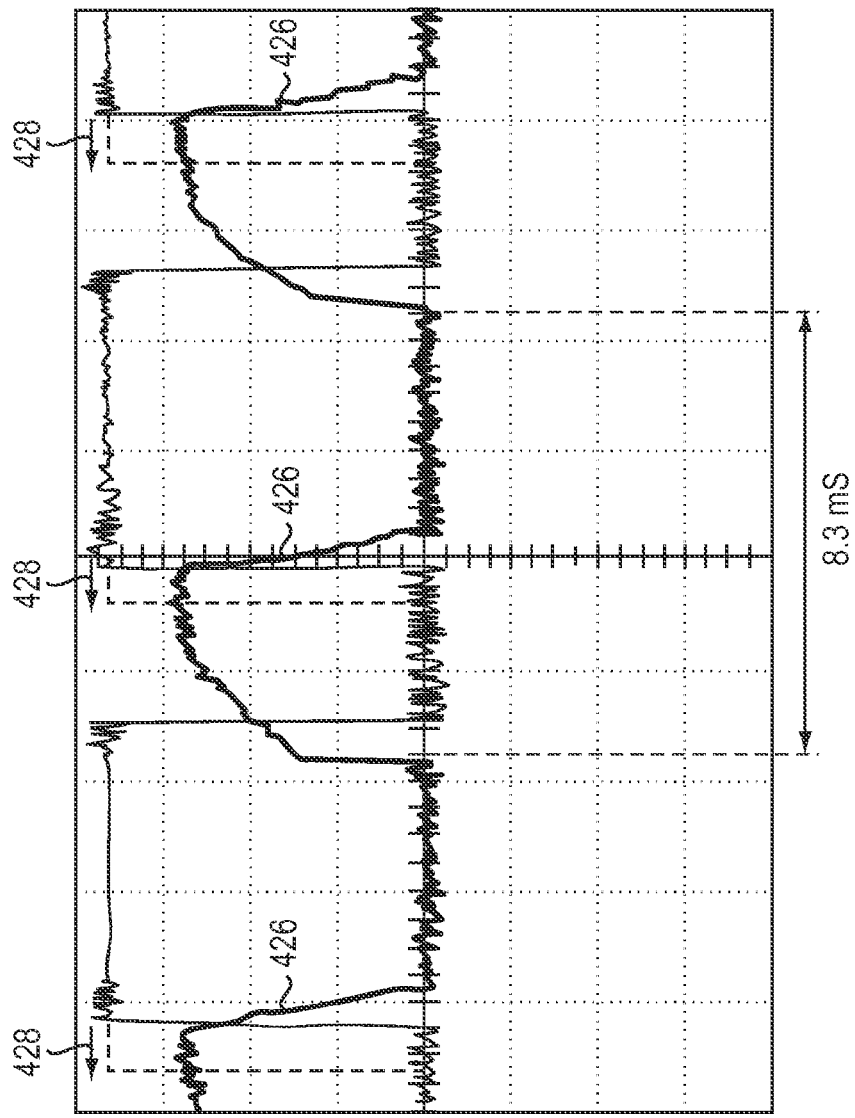
FIG. 4D depicts an output waveform of an electronic transformer having a properly operated bleed circuit.

Referring to FIG. 4A, some electronic transformers may generate an output voltage waveform having a longer trailing edge 410. When a dimmer circuit is applied to the LED lamp utilizing such a transformer, a large portion of the trailing edge 410 is chopped, as depicted in FIG. 4B. Because the chopped trailing edge 412 may have a cut-off waveform at an early time 414 of the trailing edge, the bleed-on timer may be reset to start at an earlier time to ensure the proper operation of the bleed circuit. Note that because the leading edge is not affected by an application of this dimmer circuit, the bleed-off timer settings remains the same. If, however, the dimmer circuit chops the output voltage waveform at the leading edge rather than the trailing edge, the setting of the bleed-on timer may be changed while that of the bleed-off timer remains the same. Adjusting the bleed-on timer based on the output voltage waveform is important every time a new electronic transformer is used in the LED lamp. For example, FIG. 4C depicts an output voltage waveform during an improper application of the bleed circuit to the electronic transformer. Waveforms 418, 420 are incomplete, containing small pulses 422, 424; this places the electronic transformer into sleep mode and, consequently, causes flickering of the LED lamp. FIG. 4D illustrates an approach to solving this problem, namely, applying the bleed circuit to the transformer at an earlier time (in this case, approximately 64 μs earlier) in the trailing edge 426 of the output voltage waveform as indicated by the arrows 428. After each adjustment, the period of the waveform is measured again. If approximately 8.33 ms is obtained, the bleed circuit is appropriately applied, and the new bleed-on and/or bleed-off times is then set and stored in non-volatile memory. However, if the period still falls outside the ±10% window, the bleed circuit is applied an additional 64 μs earlier. This procedure may be iteratively implemented until the measured period is approximate 8.3 ms, as shown in FIG. 4B. In one embodiment, a total increase of thirty-two steps, each increasing the bleed-on time by 64 μs (or 2 ms in total), is set as an adjustment limit so as to avoid excessive power dissipation in the bleed circuit. The properly adjusted bleed-on and bleed-off times, again, can be stored in non-volatile memory 337 for later retrieval. Use of the stored data may thus prevent the LED lamp from flickering at the beginning of the next operation. Although the discussion herein focuses on transformers having a frequency of 60 Hz, the present invention is not limited to transformers having an output voltage of a particular frequency. In addition, the incremental application time for adjusting the bleed-on timer is not limited to 64 μs and the number of steps are not limited to thirty-two steps, any suitable incremental time and/or steps may be applied to the bleed circuit and are within the scope of the current invention.

In various embodiments, the analyzer is provided as either software, hardware, or some combination thereof. For example, the system may be implemented on one or more processors such as application specific integrated circuits (ASIC), field programmable gate arrays (FPGA), or programmable logic devices (PLD). The analyzer may also include a main memory unit for storing programs and/or data relating to the activation or deactivation described above. The memory may include random access memory (RAM), read only memory (ROM), and/or FLASH memory residing on commonly available hardware such as one or more of the processors listed above, electrically erasable programmable read-only memories (EEPROM), or programmable read-only memories (PROM).

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of operating an LED system including an electronic transformer, the method comprising:
   monitoring an output voltage waveform of the transformer;
   computing a bleed-on cycle time by initiating a bleed-on timer when the output voltage waveform falls below a predetermined minimum threshold and turning off the bleed-on timer when the output voltage waveform exceeds a predetermined maximum threshold;
   computing a bleed-off cycle time by initiating a bleed-off timer when the output voltage waveform exceeds the predetermined maximum threshold and turning off the bleed-off timer when the output voltage waveform falls below the predetermined minimum threshold;
   storing the bleed-on cycle time and the bleed-off cycle time in a computer memory;
   during a later use of the LED system, when the LED system is turned on, retrieving the bleed-on cycle time and the bleed-off cycle time from the computer memory; and
   engaging a bleed circuit to the transformer in accordance with the bleed-on cycle time and disengaging the bleed circuit from the transformer in accordance with the bleed-off cycle time, the bleed circuit being engaged for a duration adequate to ensure a minimum load on the transformer sufficient to avoid cut-off throughout the output voltage waveform.

2. The method of claim 1, further comprising updating the bleed-on cycle time and the bleed-off cycle time in accordance with changes in the output voltage waveform.

3. The method of claim 2, wherein the updating occurs every cycle or every few cycles of the output voltage waveform.

4. The method of claim 1, further comprising updating the bleed-on cycle time in accordance with changes in the output voltage waveform more frequently than updating the bleed-off cycle time in accordance with changes in the output voltage waveform.

5. The method of claim 1, wherein the bleed-on cycle time is substantially equivalent to a period of the output voltage waveform.

6. The method of claim 1, further comprising eliminating a delay in computing the bleed-on cycle time or in computing the bleed-off cycle time by using the time stored from a previous cycle in a current cycle.

7. The method of claim 1, further comprising computing the bleed-off cycle time only one time.

8. The method of claim 7, wherein the bleed-off cycle time is computed when the LED system is first powered on.

9. A system for minimizing flicker in a circuit comprising an LED lamp and an electronic transformer, the system comprising:
   a bleed circuit;
   an analyzer for monitoring an output voltage waveform of the transformer and determining a bleed-on cycle time and a bleed-off cycle time based at least in part on the monitored output voltage waveform;
   a memory for storing the bleed-on cycle time and the bleed-off cycle time; and
   control circuitry for (i) retrieving the bleed-on cycle time and the bleed-off cycle time from the computer memory when the LED lamp is turned on and (ii) selectively engaging the bleed circuit to the transformer in accordance with the retrieved cycle times, the bleed circuit ensuring a minimum load on the transformer sufficient to avoid cut-off.

10. The system of claim 9, wherein the bleed circuit comprises at least one of a resistor or a transistor.

11. The system of claim 9, wherein the analyzer is configured to start a bleed-on timing cycle when a trailing edge of the output voltage waveform falls below a predetermined threshold and to end the bleed-on timing cycle when a subsequent trailing edge of the output voltage waveform falls below a predetermined minimum threshold.

12. The system of claim 11, wherein the analyzer is configured to start a bleed-off timing cycle when a leading edge of the output voltage waveform begins to rise and to end the bleed-off timing cycle when the leading edge of the output voltage waveform exceeds a predetermined maximum threshold.

13. The system of claim 12, wherein the control circuit is configured to engage the bleed circuit at a start of a bleed-on timing cycle and to disengage the bleed circuit at an end of a bleed-off timing cycle.

* * * * *